United States Patent
Ichikawa et al.

[11] Patent Number: 6,112,510
[45] Date of Patent: Sep. 5, 2000

[54] SILENT-CHAIN TRANSMISSION APPARATUS

[75] Inventors: Kouichi Ichikawa, Hatoyama-machi; Makoto Kanehira; Tsutomu Haginoya, both of Iruma; Nobuto Kozakura, Hanno; Kenshi Suzuki, Takatsuki; Masatoshi Sonoda, Daito, all of Japan

[73] Assignee: Tsubakimoto Chain Co., Osaka, Japan

[21] Appl. No.: 09/198,619

[22] Filed: Nov. 24, 1998

[30] Foreign Application Priority Data

Aug. 13, 1998 [JP] Japan .................. 10-3076247

[51] Int. Cl.$^7$ .................................. F16G 13/04
[52] U.S. Cl. ................................ 59/5; 474/212
[58] Field of Search .................. 59/4, 5; 474/206, 474/212, 213, 215, 214

[56] References Cited

U.S. PATENT DOCUMENTS

| | | | |
|---|---|---|---|
| 799,073 | 9/1905 | Morse | 474/212 |
| 1,086,146 | 2/1914 | Dodge | 474/212 |
| 1,580,910 | 4/1926 | Layman et al. | 474/212 |
| 1,598,906 | 9/1926 | Dull | 474/215 |
| 2,525,561 | 10/1950 | Pierce | 474/215 |
| 4,759,740 | 7/1988 | Cradduck | 474/212 |
| 5,419,743 | 5/1995 | Takeda et al. | 474/215 |
| 5,628,702 | 5/1997 | Kotera | 474/213 |

FOREIGN PATENT DOCUMENTS

| | | |
|---|---|---|
| 1-56304 | 11/1989 | Japan . |
| 10-2383 | 1/1998 | Japan . |

OTHER PUBLICATIONS

Patent Abstracts of Japan, vol. 1998, No. 05, Apr. 30, 1998 & JP 10 002383 A (Tsubakimoto Chain Co).

Patent Abstracts of Japan, vol. 011, No. 392 (M–653), Dec. 22, 1987 & JP 62 159829 A (Borg Warner Ootomooteibu KK), Jul. 15, 1987.

*Primary Examiner*—David Jones
*Attorney, Agent, or Firm*—Armstrong, Westerman, Hattori, McLeland & Naughton

[57] ABSTRACT

A silent-chain transmission apparatus includes a silent chain and a sprocket. The silent chain is formed of a plurality of plates, each of which has a pair of link teeth each having an inner crotch and an outer flank. The plates are connected through use of connection pins. The sprocket has sprocket teeth that come into meshing engagement with the link teeth of the silent chain. Each of the inner crotches has a projection that is formed on a tooth tip side with respect to a working pitch line and has a straightly profiled portion.

3 Claims, 8 Drawing Sheets

SILENT-CHAIN TRANSMISSION APPARATUS

BACKGROUND OF THE INVENTION

1. Field of the Invention

The present invention relates to a silent-chain transmission apparatus which uses a silent chain including plates capable of reducing noise generated from meshing engagement between the silent chain and a sprocket.

2. Description of the Related Art

In conventional silent-chain transmission apparatuses for used in engines, etc., various kinds of improved chain plates are use in order to reduce noise generated during operation. However, the noise-reducing performances of these plates are considered unsatisfactory.

For example, the conventional silent-chain transmission apparatus disclosed in Japanese Patent Publication (kokoku) No. 1-56304 uses a silent chain as shown in FIG. 6A. In the silent chain, outer flanks 2A of a pair of teeth of one plate 1A are formed such that they project outward from inner crotches 3B of teeth of another plate 1B that overlaps with and is offset from the plate 1A by a single tooth pitch. The silent chain exhibits a so-called "outer-flank contact" process as shown in FIG. 6B, in which at the point where the silent chain starts to engage the sprocket S, an outer flank 2B of one plate 1A located at the rear side in the travel direction first comes into contact with a tooth of the sprocket S, and at the point where the silent chain establishes complete engagement with the sprocket S, both outer flanks 2C of an adjacent plate 1C come into contact with other teeth of the sprocket S.

In such a silent-chain transmission apparatus, since only the outer flanks of each plate come into contact with teeth of the sprocket S, a large impact force acts on the outer flanks, resulting in rapid wear of the outer flanks and generation of harsh noise.

Meanwhile, the conventional silent-chain transmission apparatus disclosed in Japanese Patent Publication (kokoku) No. 1-56304 uses another silent chain as shown in FIG. 7A. In the silent chain, inner crotches 3A of a pair of teeth of one plate 1A are formed such that they project outward from outer flanks 2B of teeth of another plate 1B that overlaps with and is offset from the plate 1A by a single tooth pitch. The silent chain exhibits a so-called "inner-crotch/outer-flank two-step contact" process as shown in FIG. 7B, in which at the point where the silent chain starts to engage the sprocket S, an outer flank 2B of one plate 1B and an inner crotch 3A of another plate 1A that overlaps with the plate 1B come into contact with the same tooth of the sprocket S at the same time or with a time difference therebetween.

In such a silent-chain transmission apparatus, meshing engagement is established in the vicinity of a working pitch line L, and the load tension of the chain acting on the teeth concentrates at the vicinity of the working pitch line L. Therefore, the tooth surface of the sprocket S wears easily and such wear cannot be avoided.

Further, the conventional silent-chain transmission apparatus disclosed in Japanese Patent Application Laid-Open (kokai) No. 10-2383 uses a silent chain as shown in FIG. 8. In the silent chain, projections 3A', 3B', and 3C' each having a curved profile are formed at the tip portions of inner crotches 3A, 3B, and 3C of plates 1A, 1B, and 1C, which constitute the silent chain. The silent chain exhibits a so-called "inner-crotch/outer-flank two-step contact" process, in which at the point where the silent chain starts to engage the sprocket S, the projection 3A' of, for example, the inner crotch 3A come into contact with a tooth of the sprocket S, and the outer flank 2B then comes into contact with the same tooth of the sprocket S.

In such a silent-chain transmission apparatus, the projections come into contact with teeth of the sprocket S at positions offset toward the teeth tips with respect to the working pitch line L, while the outer flanks 2A, 2B, and 2C come into contact with and seat on the teeth at positions on the working pitch line L. Therefore, the load tension of the chain acting on the teeth does not concentrate at the vicinity of the working pitch line L, and thus the problem involved in the silent-chain transmission apparatus shown in FIGS. 6A and 6B has been solved. However, since the projections have a curved profile and therefore come into sliding contact with teeth of the sprocket through the same portions, the projections of the inner crotches wear easily, so that the endurance strength of the entire chain cannot be maintained for a long period of time.

SUMMARY OF THE INVENTION

In view of the foregoing, an object of the present invention is to provide a silent-chain transmission apparatus in which inner crotches and outer flanks of plates of a silent chain both bear impact generated from meshing engagement of the silent chain with a sprocket, in which the inner crotches smoothly establish meshing engagement with teeth in order to prevent wear of the inner crotches, thereby maintaining the endurance strength of the entire chain for a long period of time, and in which a time difference is provided between the time of establishing meshing engagement of the projection of each inner crotch with the sprocket and the time of establishing meshing engagement of each outer flank with the sprocket in order to reduce noise.

To achieve the above object, the present invention provides a silent-chain transmission apparatus which comprises a silent chain and a sprocket. The silent chain is formed of a plurality of plates, each of which has a pair of link teeth each having an inner crotch and an outer flank, the plates being connected by means of connection pins. The sprocket has sprocket teeth that come into meshing engagement with the link teeth of the silent chain. Each of the inner crotches has a projection that is formed on a tooth tip side with respect to a working pitch line and has a straightly profiled portion.

In the specification, the expression "working pitch line" means a part of a working pitch circle in a state in which complete meshing engagement is established between the silent chain and the sprocket (i.e., state in which teeth of the silent chain completely seat on teeth of the sprocket). The working pitch line changes depending on the shape of the plates of the silent chain and the shape and number of teeth of a sprocket with which the silent chain comes into meshing engagement.

The essential requirement regarding the specific shape of the inner crotches of the plates of the silent chain used in the present invention is such that each of the inner crotches has a projection that is formed on a tooth tip side with respect to a working pitch line and has a straightly profiled portion. On the bottom side portion of the tooth relative to the working pitch line, each inner crotch may have any shape insofar as the inner crotch does not come into contact with the tooth surface of the sprocket. However, the bottom side portion of the inner crotch is advantageously formed into a straight or flat shape in consideration of the strength of the plate itself and manufacturing cost.

In order to establish smooth sliding contact with the sprocket, it is important that the straightly profiled portion of the projection-be disposed parallel to the straight portion of the inner crotch.

Needless to say, the specific shape of the outer flanks of the silent chain used in the present invention is a flat shape. The flat outer flanks can stably transmit power in a state in which the outer flanks have come into contact with and seated on the teeth of the sprocket at positions on the working pitch line. Such flat outer flanks can be formed in a manner similar to that for plates of an ordinary silent chain. Further, an ordinary sprocket for a silent chain having the same pitch can be used as is.

In the silent-chain transmission apparatus of the present invention, since each of the inner crotches has a projection that is formed on a tooth tip side with respect to a working pitch line and has a straightly profiled portion, the following advantageous effects can be achieved.

1) Before an outer flank of a plate comes into meshing engagement with a tooth flank of a sprocket, an inner crotch projection having a straightly profiled portion comes into contact with the same tooth flank. Thus, the inner crotch and the outer flank both bear impact generated from meshing engagement to thereby reduce meshing noise.

2) When the projection of the inner crotch comes into contact with a tooth flank of the sprocket, the load tension of the chain acts on the projection of the inner crotch. However, immediately after the engagement of the inner crotch with the tooth flank, an outer flank of a preceding plate comes into meshing engagement with the same tooth flank, and the projection of the inner crotch separates from the tool flank, so that the projection of the inner crotch is relieved from the load tension of the chain. Therefore, a period of time during which the load tension acts on the inner crotch can be shortened, so that the strength of the entire chain can be maintained.

3) During a period of meshing engagement, the load tension is transferred to a sprocket tooth flank through two points, i.e., a point on the tooth tip side with respect to the working pitch line where the projection comes into contact with the sprocket tooth flank and a point on the working pitch line where the outer flank comes into contact with the sprocket tooth flank, and there is produced a time difference between the load tension transfers at the two points. Therefore, impact generated from transfer of the load tension can be mitigated.

4) Since the projection of the inner crotch has a straightly profiled portion, an area for sliding contact with the sprocket increases, so that the projection smoothly comes into contact with the sprocket. Therefore, wear of the projection of the inner crotch can be prevented, and thus the endurance strength of the entire chain can be maintained for a long period of time.

5) Since the projection of the inner crotch is formed on the tooth tip side with respect to the working pitch line, there is produced a slight elastic deformation such that the distance between the pair of link teeth increases. Therefore, there can be mitigated impact that is generated when the point of contact moves from the projection having the straightly profiled portion to the outer flank.

6) The outer flanks of each plate are formed to have the same flat shape as that of plates of a silent chain that forms an ordinary pressure angle. This allows selection of an ordinary sprocket in accordance with the pressure angle of the silent chain. Therefore, management in relation to manufacture of hobs is facilitated, and the processes of manufacturing sprockets and inventory control of the sprockets do not become complex.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIGS. 4A, 4B, and 4C are enlarged views each showing the state of meshing engagement between the sprocket and a projection having a straightly profiled portion, wherein FIG. 4A shows a state in which meshing engagement starts, FIG. 4B shows a state in which the meshing engagement proceeds, and FIG. 4C shows a state immediately before completion of the meshing engagement;

FIGS. 6A and 6B show a conventional silent-chain transmission apparatus, wherein FIG. 6A is a front view of a silent chain, while FIG. 6B is a view showing the meshing operation thereof;

FIGS. 7A and 7B show another conventional silent-chain transmission apparatus, wherein FIG. 7A is a front view of a silent chain, while FIG. 7B is a view showing the meshing operation thereof.

DESCRIPTION OF THE PREFERRED EMBODIMENTS

Figure 1:
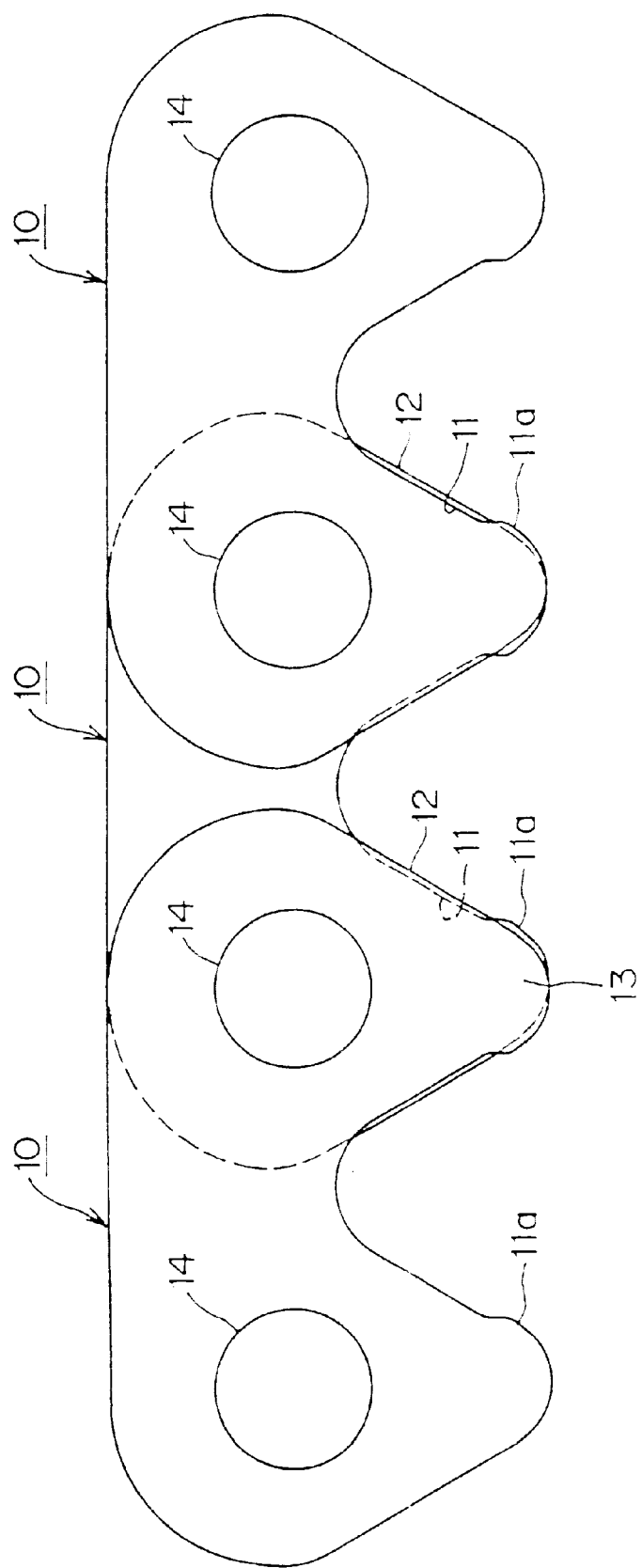
FIG. 1 is a front view of a silent chain used in a silent-chain transmission apparatus according to an embodiment of the present invention.

A silent-chain transmission apparatus according to an embodiment of the present invention will next be described in detail with reference to the drawings. In the following description, the terms "front-side" and "rear-side" are used with respect to the travel direction of the chain. FIG. 1 is a front view of a silent chain used in the present embodiment. Each plate 10 has a pair of link teeth 13 each having an inner crotch 11 and an outer flank 12. The plate 10 also has a pair of connection holes 14 into which unillustrated connection members are inserted. On the inner crotch 11 of the plate 10 is formed a projection 11a which has a straightly profiled portion and extends from a working pitch line L toward the tooth tip. A large number of the plates 10 are connected by means of connection pins, such as rocker pins, which serve as connection members, in order to constitute a flexible, endless silent chain.

In the state shown in FIG. 1 in which the silent chain is extended straightly, a projection 11a that is provided on an inner crotch 11 of a certain plate 10 and has a straightly profiled portion projects outward from a corresponding outer flank 12 of another adjacent plate 10 that overlaps with and is offset from the certain plate 10 by a single tooth pitch. The degree of projection of the projection 11a is set such that the projection 11a becomes flush with the outer flank 12 of the adjacent plate 10 when the meshing engagement between the projection 11a and a sprocket 20 (shown in FIG. 2) is broken to establish the meshing engagement between the outer flank 12 and the sprocket 20 (shown in FIG. 3).

Figure 4A:
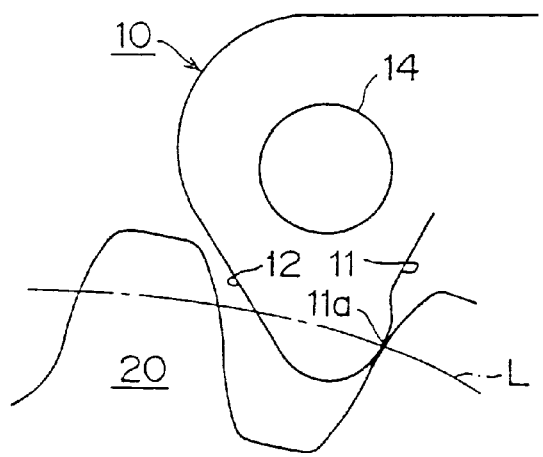
Figure 4B:
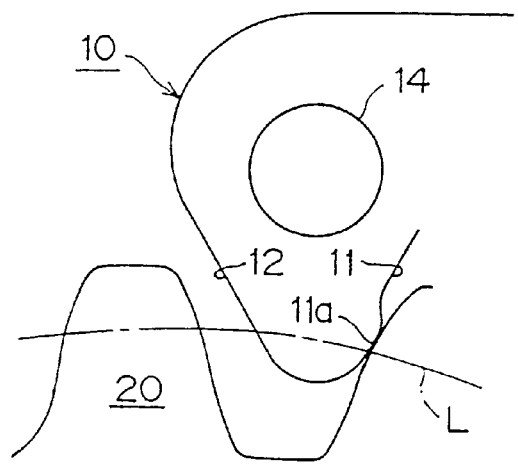
Figure 4C:
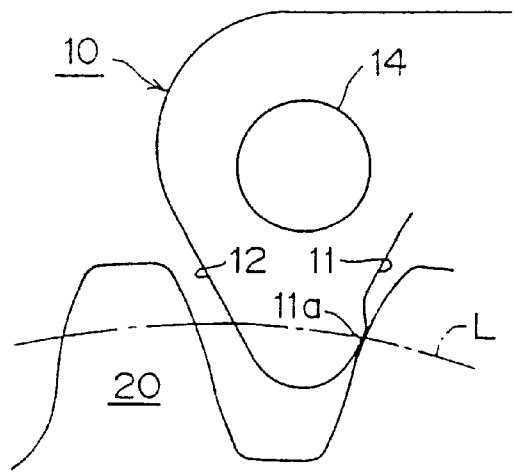

FIGS. 4A, 4B, and 4C are enlarged views each showing the state of meshing engagement between the sprocket 20 and the projection 11a having a straightly profiled portion, wherein FIG. 4A shows a state in which meshing engagement starts, FIG. 4B shows a state in which the meshing engagement proceeds, and FIG. 4C shows a state immediately before completion of the meshing engagement.

The sprocket 20 with which the silent chain comes into meshing engagement is a generally-used standard sprocket that has involute teeth on at least the tooth tip side with respect to the working pitch line L.

Figure 5:
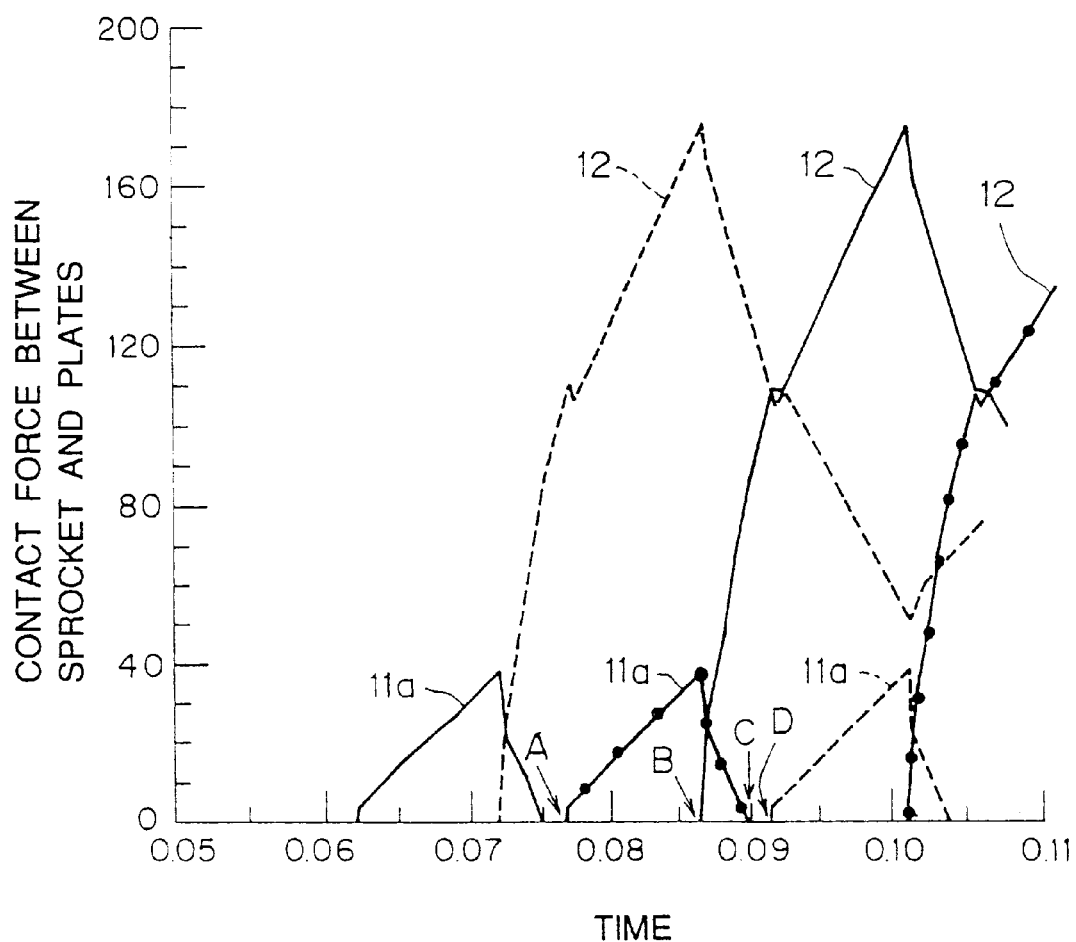
FIG. 5 shows a graph showing variation in contact force between the sprocket and plates with time.
Figure 6A:
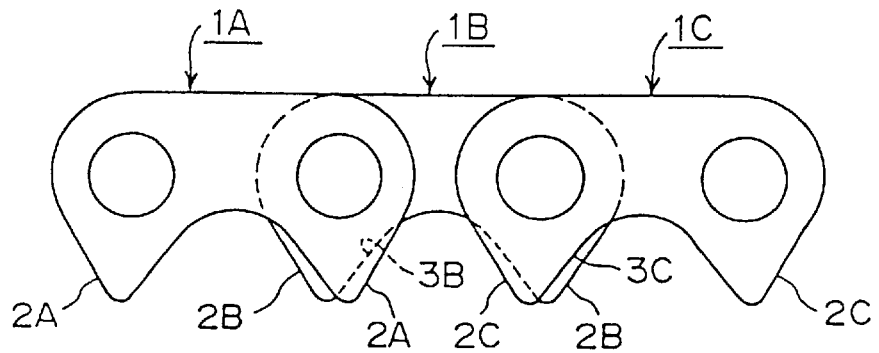
Figure 6B:
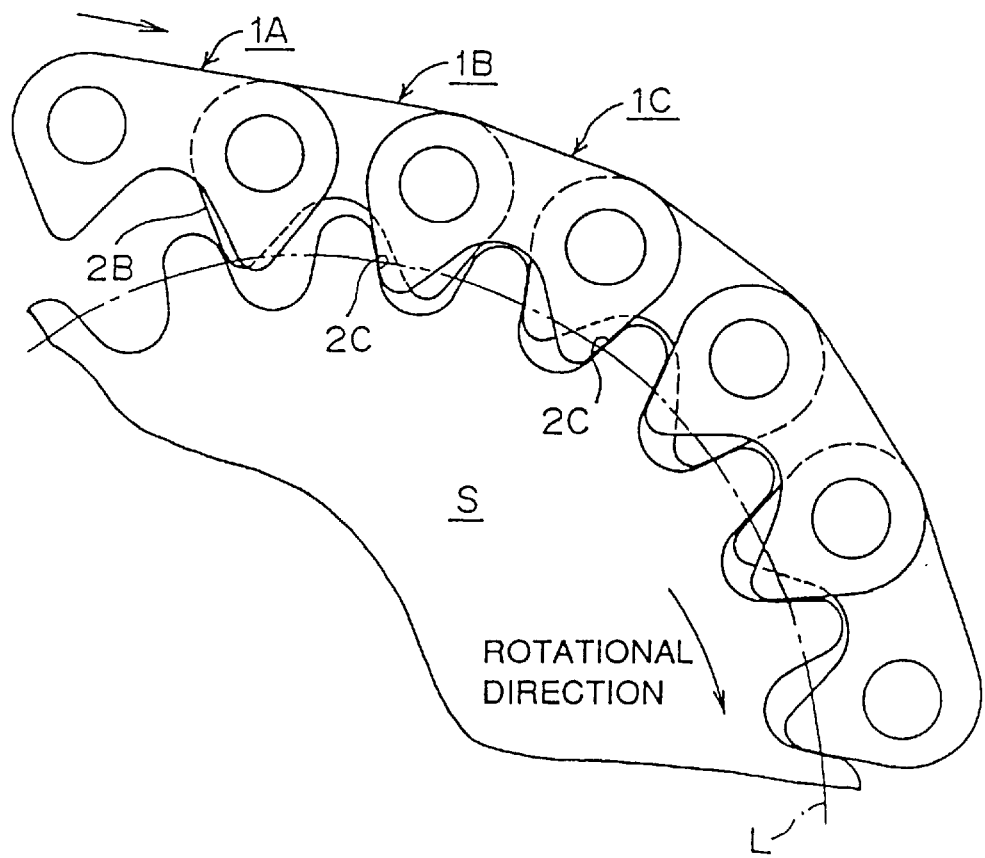
Figure 7A:
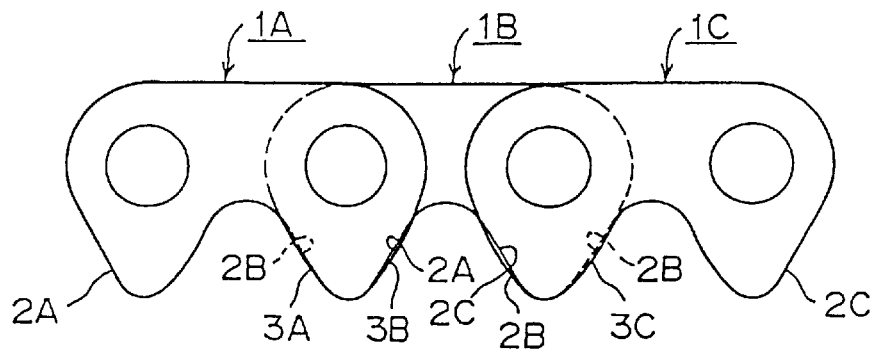
Figure 7B:
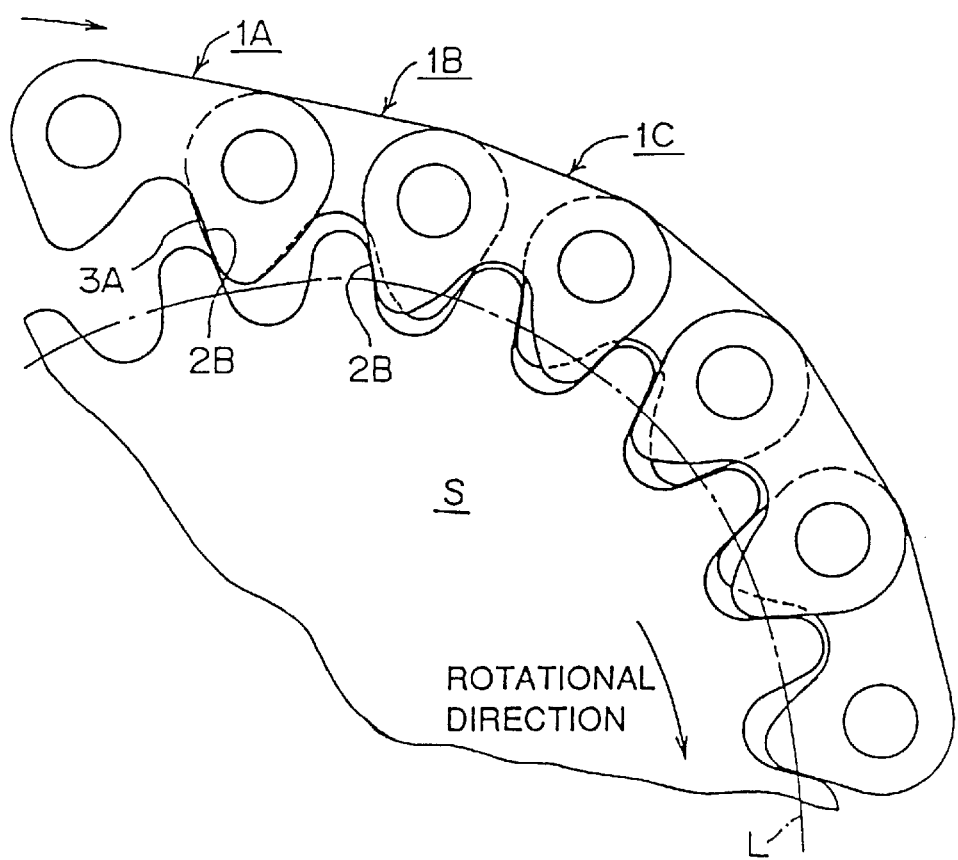
Figure 8:
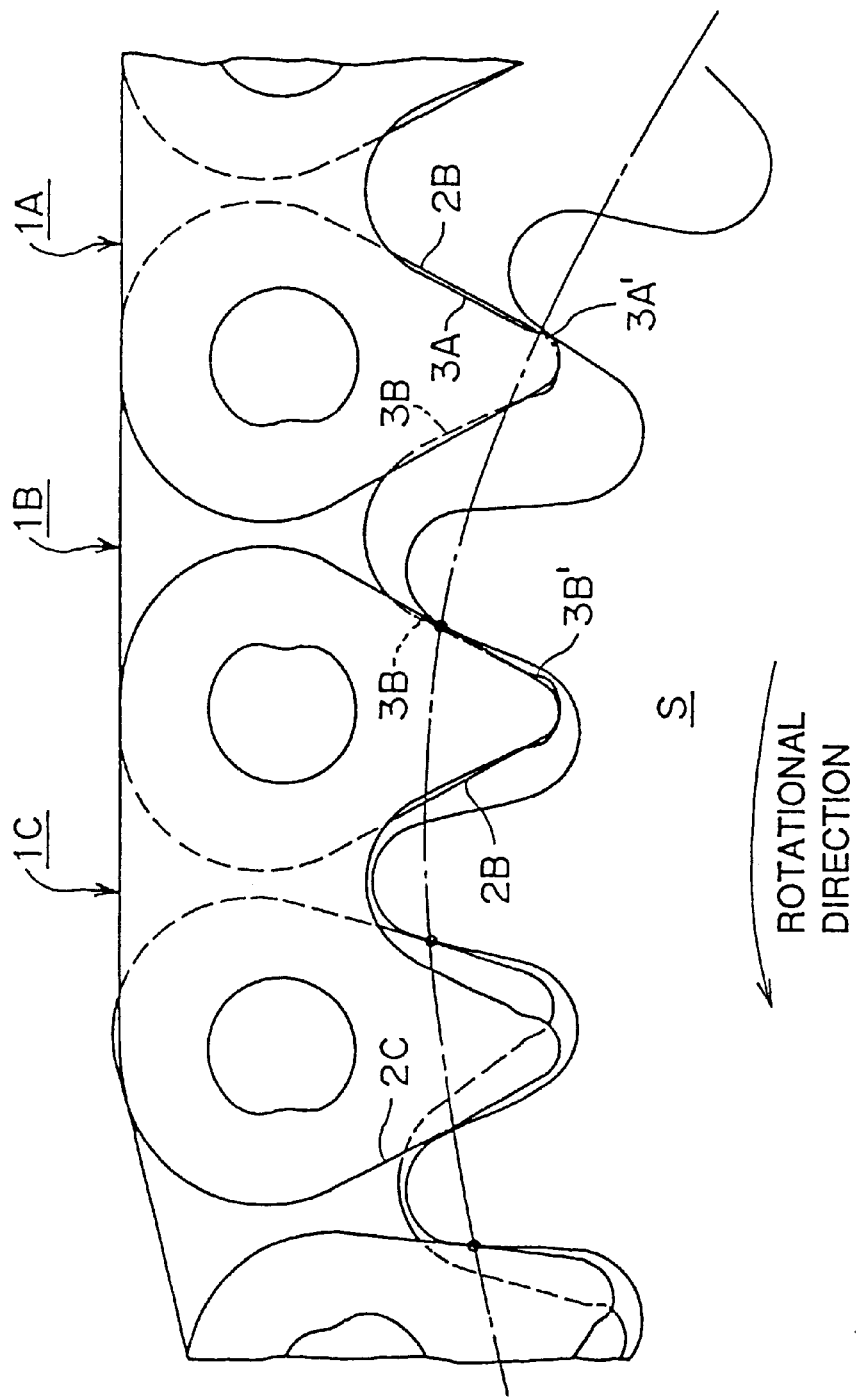
FIG. 8 shows the meshing operation of still another conventional silent-chain transmission apparatus.

FIG. 5 shows a graph showing variation in contact force of the silent chain acting on the sprocket with time; i.e., variation in the meshing state of the silent-chain transmission apparatus according to the present embodiment. In FIG. 5, the horizontal axis represents passage of time, and the vertical axis represents the contact force of the silent chain acting on the sprocket.

Figure 2:
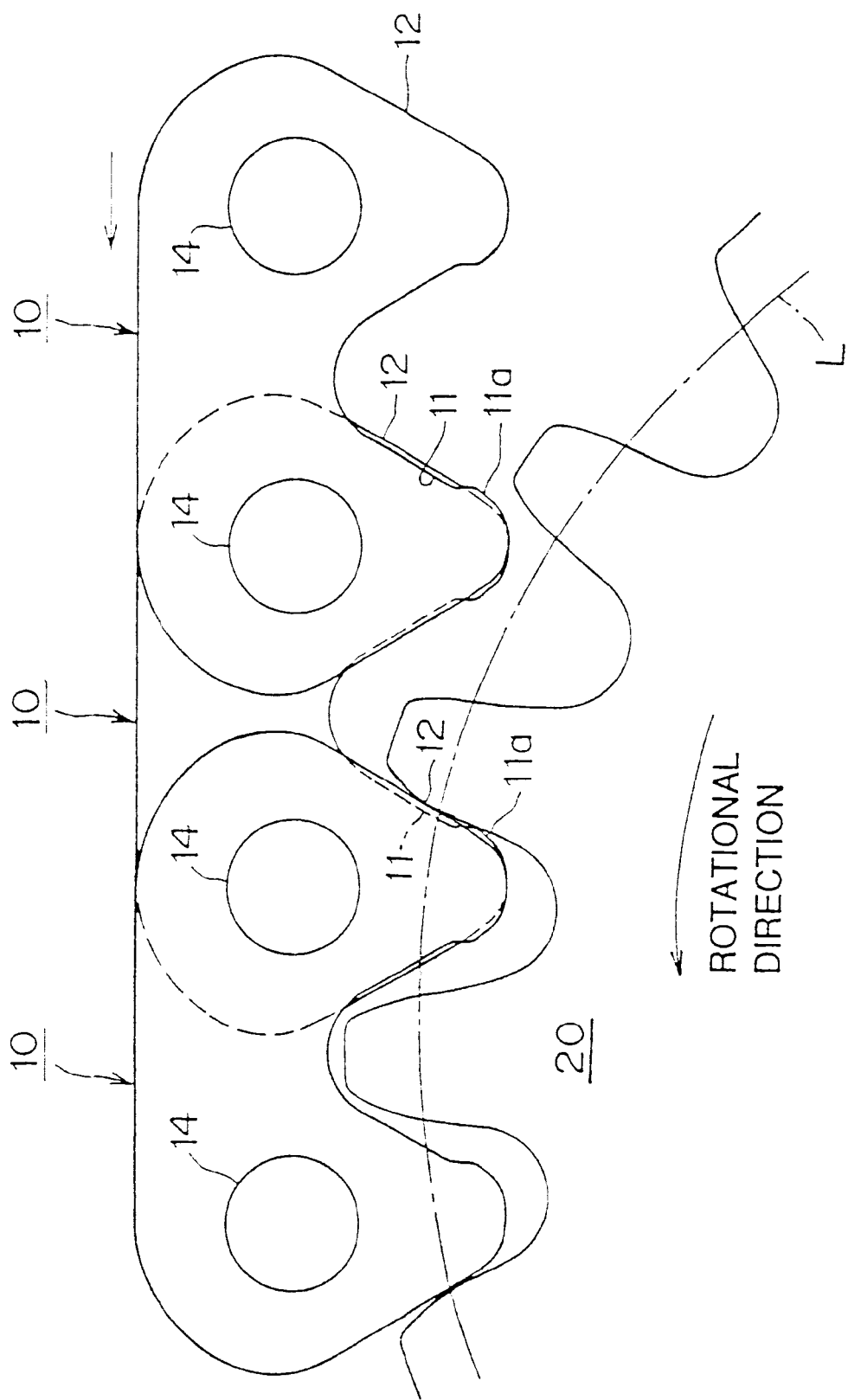
FIG. 2 is a partial view of the silent chain and a sprocket showing a state in which a certain portion of the chain has started meshing engagement with the sprocket.
Figure 3:
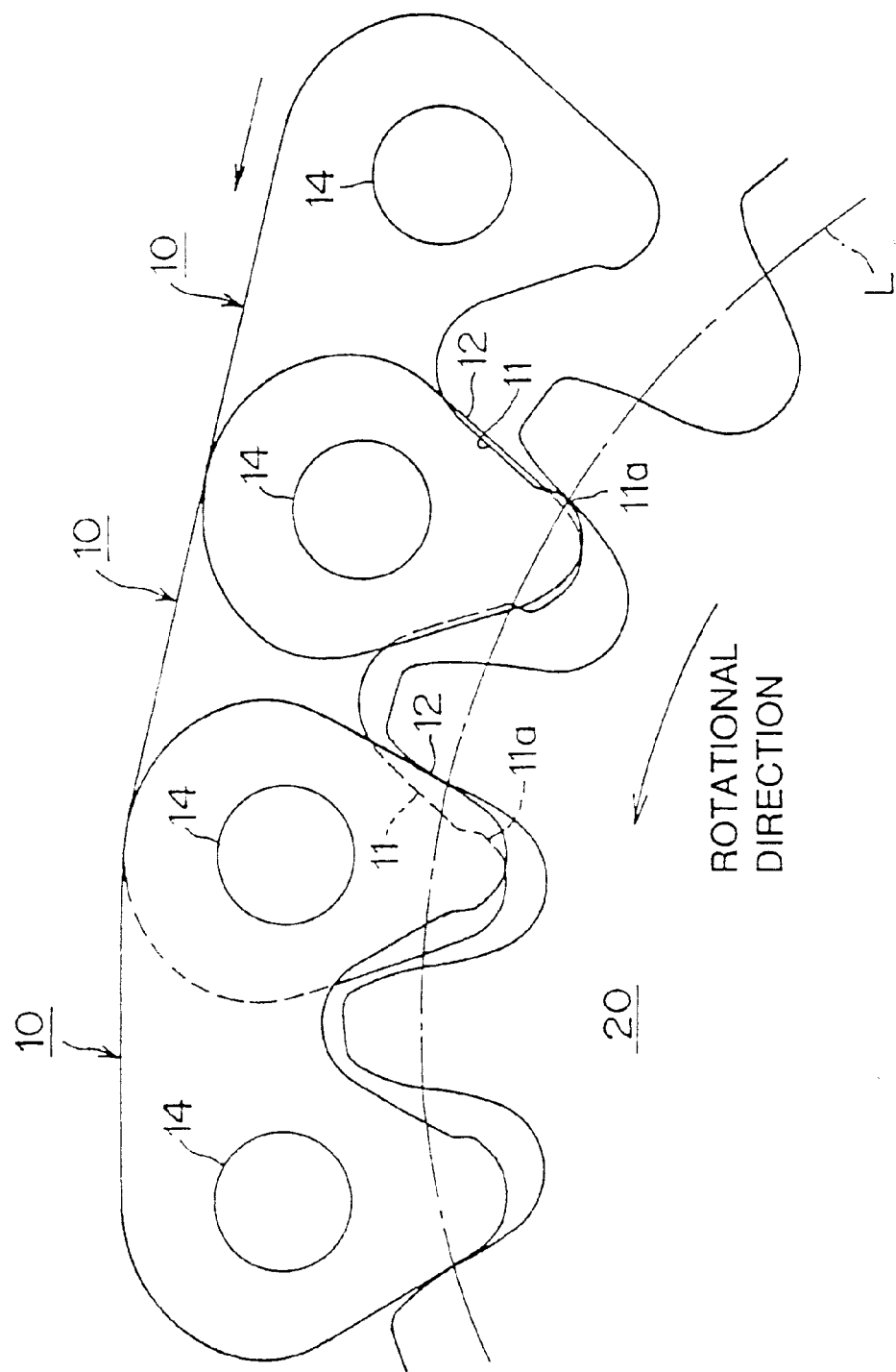
FIG. 3 is a partial view of the silent chain and a sprocket showing a state in which the meshing engagement shown in FIG. 2 has further proceeded.

When a certain portion of the chain starts to establish meshing engagement with the sprocket 20, as shown in FIG. 2, a front-side projection 11a—which has a straightly profiled portion and is formed on an inner crotch 11 of a certain plate 10—comes into contact with a tooth flank of the sprocket 20 at a position on the tooth tip side with respect to the working pitch line L (see point A in FIG. 5).

Subsequently, while the projection 11a having a straightly profiled portion is in contact with the tool flank of the sprocket 20, a rear-side outer flank 12—which is formed on another plate 10 that established meshing engagement before the certain plate 10 established meshing engagement—starts to come into contact with the same tooth flank of the sprocket 20, while sliding along the tool flank (see point B in FIG. 5).

At the time when the outer flank 12 starts to come into contact with the same tooth flank of the sprocket 20, the projection 11a having a straightly profiled portion separates from that tooth flank, while sliding along the tool flank.

When the projection 11a having a straightly profiled portion separates from that tooth flank (see point C in FIG. 5), a front-side projection 11a—which has a straightly profiled portion and is formed on an inner crotch 11 of another plate 10 that establishes meshing engagement after the certain plate 10—comes into contact with the next tooth flank of the sprocket 20 (see point D in FIG. 5).

In this manner, the establishment and breakage of engagement of the projection of the inner crotch with respect to the sprocket is successively repeated whenever the silent chain is moved by a distance corresponding to the pitch of the chain, and engagement between the outer flank and the tooth flank of the sprocket is continued until the corresponding plate separates from the sprocket, so that power is transmitted between the sprocket and the chain.

Obviously, numerous modifications and variations of the present invention are possible in light of the above teachings. It is therefore to be understood that within the scope of the appended claims, the present invention may be practiced otherwise than as specifically described herein.

What is claimed is:

1. A silent-chain transmission apparatus comprising a silent chain and a sprocket, said silent chain and said sprocket having a working pitch line represented by a part of a working pitch circle in a state in which complete meshing engagement is established between said silent chain and said sprocket, wherein, said silent chain is formed of a plurality of plates, each having a pair of link teeth, each of said link teeth having an inner crotch, an outer flank, and a tooth tip toward which said inner crotch and said outer link converge, said plates being connected by means of connection pins;

said sprocket has sprocket teeth that come into meshing engagement with the link teeth of said silent chain, each of said sprocket teeth having a tooth flank;

each of the inner crotches has a projection formed thereon and having a straightly profiled portion extending from said working pitch line toward said tooth tip; and said straightly profiled portion of said projection of each inner crotch of one of said plates comes into contact with said tooth flank of each said sprocket tooth at a position offset toward said tooth tip with respect to said working pitch line before said outer flank of a preceding plate comes into meshing engagement with the same tooth flank at a position on said working pitch line.

2. A silent-chain transmission apparatus according to claim 1, wherein said inner crotch of each said link tooth has a base portion extending from said projection in a direction away from said tooth tip, and said base portion is formed into a straight shape.

3. A silent-chain transmission apparatus according to claim 2, wherein the straightly profiled portion of said projection is parallel to the straight base portion of the inner crotch.

* * * * *

UNITED STATES PATENT AND TRADEMARK OFFICE
CERTIFICATE OF CORRECTION

PATENT NO.: 6,112,510
DATED    :    September 5, 2000
INVENTOR(S): ICHIKAWA et al.

It is certified that error appears in the above-identified patent and that said Letters Patent is hereby corrected as shown below:

Under [30] Foreign Application Priority Data the Priority Date should read --August 31, 1998-- and the application no. should read --10-245309--

Signed and Sealed this

Seventeenth Day of April, 2001

Attest:

NICHOLAS P. GODICI

Attesting Officer    Acting Director of the United States Patent and Trademark Office